United States Patent [19]

Brown et al.

[11] Patent Number: 6,075,772

[45] Date of Patent: Jun. 13, 2000

[54] METHODS, SYSTEMS AND COMPUTER PROGRAM PRODUCTS FOR CONTROLLING DATA FLOW FOR GUARANTEED BANDWIDTH CONNECTIONS ON A PER CONNECTION BASIS

[75] Inventors: Patrick G. Brown, Raleigh; Kimi A. Cousins, Apex, both of N.C.; John R. Flanagan, Poughkeepsie, N.Y.; Maurice Isrel, Raleigh, N.C.; Balachandar Rajaraman, Cary, N.C.; Arthur J. Stagg, Raleigh, N.C.; Mooheng Zee, Fishkill, N.Y.

[73] Assignee: International Business Machines Corporation, Armonk, N.Y.

[21] Appl. No.: 08/920,598

[22] Filed: Aug. 29, 1997

[51] Int. Cl.[7] .................................................. H04L 12/26
[52] U.S. Cl. ........................... 370/235; 370/412; 370/428
[58] Field of Search .................................. 370/229, 232, 370/233, 234, 235, 412, 428, 429

[56] References Cited

U.S. PATENT DOCUMENTS

| 5,455,826 | 10/1995 | Ozveren et al. | 370/232 |
| 5,579,312 | 11/1996 | Regache | 370/397 |
| 5,583,857 | 12/1996 | Soumiya et al. | 370/233 |
| 5,675,573 | 10/1997 | Karol et al. | 370/230 |
| 5,732,078 | 3/1998 | Arango | 370/355 |
| 5,802,040 | 9/1998 | Park et al. | 370/232 |

*Primary Examiner*—Ajit Patel
*Assistant Examiner*—Bob A. Phunkulh
*Attorney, Agent, or Firm*—Myers Bigel Sibley & Sajovec; Jerry W. Herndon

[57] ABSTRACT

Methods, systems (apparatus) and computer program products that control the data rate through a communications adapter having at least one guaranteed bandwidth connection through the communications adapter are provided. The data rate is controlled by assigning to the guaranteed bandwidth connection, a maximum threshold value proportional to the amount of data to be transmitted through the communications adapter in a time interval to satisfy the guaranteed bandwidth of the connection. The amount of data transmitted through the communications adapter for the guaranteed bandwidth connection is then counted so as to provide a connection data count associated with the guaranteed bandwidth. Data transmitted for the communications adapter associated with the guaranteed bandwidth connection is not transmitted to the communications adapter if transmission of the data would cause the connection data count to exceed the maximum threshold value assigned to the guaranteed bandwidth connection. The connection data count is then reset after expiration of the time interval.

35 Claims, 4 Drawing Sheets

METHODS, SYSTEMS AND COMPUTER PROGRAM PRODUCTS FOR CONTROLLING DATA FLOW FOR GUARANTEED BANDWIDTH CONNECTIONS ON A PER CONNECTION BASIS

FIELD OF THE INVENTION

The present invention relates to data processing systems and more particularly to data processing systems utilizing guaranteed bandwidth connections to connect to other data processing systems.

BACKGROUND OF THE INVENTION

Data processing systems which allow for multiple concurrent processes have been known for years. For example, multi-user systems employing mainframe computers with remote terminals include IBM VM and MVS systems. These systems allow for multiple processes on a single computer system. As a result, the hardware of the data processing system may be shared across multiple users or multiple processes.

One example of a shared resource in a data processing system may be a network communication adapter. A network communication adapter allows a computer to communicate with other computers in a network, such as for example, over the Internet or an intranet. The communication adapter receives data from the computer system and transmits the data over the network. Similarly, the communication adapter may receive data from the network and provide the data to the computer system. In many modern layered data processing systems, the hardware of the communication adapter receives data from and provides data to the Dynamic Link Control (DLC) layer of the computer system.

Connections to the communications adapter generally fall into two categories: guaranteed bandwidth connections and best efforts connections. Guaranteed bandwidth connections result from negotiation between the DLC layer and the adapter to establish a guaranteed transmission rate for a connection through the adapter. Thus, for example, a connection may be establish through an adapter which guarantees a throughput of 1 megabyte of data per second. In a best efforts connection, the adapter utilizes whatever bandwidth is available to send the data. For example, if an adapter has a maximum throughput of 6 Mb/sec. and 3 Mb/sec. are allocated to guaranteed bandwidth connections, then on average 3 Mb/sec. will be available for use by best efforts connections. However, with a best efforts connection there is no guarantee that any bandwidth of the adapter will be available for handling the connection's data.

Typically, a communications adapter includes data buffers which buffer the data which is transmitted to and received from the DLC layer. These buffers may be used by multiple applications executing on the data processing system that use the communications adapter to communicate with the network, thus providing for multiple connections through the communications adapter. However, if more data is provided to the network communications adapter than may be buffered by the adapter, the adapter will typically discard the transmitted data. Thus, if the users or applications are using, for example, High Performance Routing (HPR), end-to-end error recovery of HPR will typically cause retransmission of the discarded data. This error recovery protocol, while providing for higher reliability, may cause reduced throughput of the adapter as bandwidth normally utilized by data communications is utilized for retransmitted data. It is, therefore, desirable to avoid the case where the buffers of the adapter are over-utilized.

An additional characteristic that may further complicate providing for both best efforts and guaranteed bandwidth connections is that the communications with the adapter may be "bursty" in that the data is not provided at a constant rate. If the peak of a burst of data is received from best efforts connection while little or no guaranteed band width data is received, then that data may over-utilize the adapter for a period of time. Because of the discontinuous nature with which data may be received by the communications adapter it may be possible for all of the buffers of the adapter to be filled by data for a best efforts communication. Therefore, the data from a guaranteed bandwidth communication may be discarded and the guaranteed bandwidth connection may not be provided with the required bandwidth. Furthermore, if a guaranteed bandwidth connection has a large amount of data to be carried by the adapter, the guaranteed bandwidth connection may dominate use of the adapter and, thereby, preclude use of other guaranteed bandwidth connections or best efforts connections. Thus, simply prioritizing the guaranteed bandwidth data may not prevent overrun of the adapter and may not provide a fair allocation of adapter usage among connections.

In light of the above discussion, a need exists for improvements in the control of data flow for guaranteed bandwidth connections.

SUMMARY OF THE INVENTION

In view of the above discussion, it is an object of the present invention to provide for improved performance of guaranteed bandwidth connections while maintaining fairness to best efforts connections.

A further object of the present invention is to provide for increased control over connections through a communications adapter to provide for fair sharing of resources.

Still a further object of the present invention is to provide for avoidance of buffer overruns in communication adapters.

Yet another object of the present invention is to provide for guaranteed bandwidth connections without requiring additional signals between a communications adapter and a device using the communications adapter to avoid buffer overrun at the adapter.

These and other objects of the present invention are provided by methods, systems (apparatus) and computer program products which control the data rate through a communications adapter having at least one guaranteed bandwidth connection through the communications adapter. The data rate is controlled by assigning to the guaranteed bandwidth connection, a maximum threshold value proportional to the amount of data to be transmitted through the communications adapter in a time interval to satisfy the guaranteed bandwidth of the connection. The amount of data transmitted through the communications adapter for the guaranteed bandwidth connection is then counted so as to provide a connection data count associated with the guaranteed bandwidth. Data transmitted for the communications adapter associated with the guaranteed bandwidth connection is not transmitted to the adapter if transmission of the data would cause the connection data count to exceed the maximum threshold value assigned to the guaranteed bandwidth connection. The connection data count is then reset after expiration of the time interval.

The assignment of a maximum threshold value is preferably based upon an amount of buffers allocated to the guaranteed bandwidth connection by the communications adapter, a time to transmit data to the communications adapter and a service time for data transmitted to the communications adapter once the data has reached the communications adapter. Furthermore, the amount of buffers allocated to the guaranteed bandwidth connection by the communications adapter and a service time for data transmitted to the communications adapter once the data has reached the communications adapter may be obtained from the communications adapter. Thus, allowing for individualized handling of the guaranteed bandwidth connections on a per connection basis for a given adapter.

By limiting the amount guaranteed bandwidth data which may be transmitted by the communications adapter other types of connections may also use the communications adapter. Thus, for a given time interval, both guaranteed bandwidth data and best efforts data are assured of being transmitted by the communications adapter. Furthermore, if more than one guaranteed bandwidth connection is established for a communications adapter, limiting each guaranteed bandwidth connection to an amount of data needed to meet the guaranteed bandwidth for the connection within the time interval guarantees that one guaranteed bandwidth connection will not occupy so much of the communications adapter that other guaranteed bandwidth requirements cannot be satisfied.

In a further embodiment of the present invention, the maximum threshold value is revised so as to compensate for actual utilization of the guaranteed bandwidth connection during a previous time interval. Such compensation may be achieved by resetting a counter to a negative value equal to the amount of under-utilization of the guaranteed bandwidth connection during an immediately previous time interval. Alternatively, if a countdown counter is utilized, the initialized value of the countdown counter can be increased by an amount equal to the under-utilization of the guaranteed bandwidth connection during an immediately previous time interval.

Compensating for actual utilization of a guaranteed bandwidth connection reduces the significance of the duration of the interval before resetting the count and takes into account the bursty nature of data flow. By increasing or decreasing allowed utilization in a subsequent time interval, the amount of data transmitted may be increased or decreased to provide the required bandwidth on an average over the two intervals. Thus, the guaranteed bandwidth may be maintained despite the peaks and valleys in usage of the guaranteed bandwidth connection.

In still another embodiment of the present invention, the time interval may vary between successive time intervals. In such a case, the assignment of maximum threshold values may compensate for variations in the time interval. Such a compensation may be accomplished by defining a default time interval associated with the guaranteed bandwidth connection upon which the maximum threshold value is based. An actual time interval between a previous occurrence of the resetting of the data count may be determined and the maximum threshold value compensated proportional to the difference between the default time interval and the actual time interval. The compensation of the maximum threshold value based upon variations in the time interval allows for maintenance of the guaranteed bandwidth despite the fluctuations.

In a further embodiment of the present invention an indicator of the guaranteed bandwidth connection is placed in a restart connection queue if data transmission to the communications adapter is suspended. Users of the guaranteed bandwidth connection are also notified that the connection is halted. Therefore, a user of the connection may buffer the data to be sent on the connection to avoid data loss and the associated problems of error recovery. Users of the connection in the restart connection queue may subsequently be notified that data may be transmitted to the communications adapter associated with the connection, such as at the next reset of the data count. The connection indicator may then be removed from the restart connection queue.

In another embodiment of the present invention, the communications adapter segregates buffers resident on the communications adapter into a pool of buffers for guaranteed bandwidth connections and a pool of buffers for best efforts connections. Requests for a connection through the communications adapter are then screened for requests for a guaranteed bandwidth connection. If the request is a guaranteed bandwidth request, then it is determined if sufficient guaranteed bandwidth buffers are available for the requested guaranteed bandwidth connection. The request for a guaranteed bandwidth connection is rejected if sufficient guaranteed bandwidth buffers are not available for the connection and accepted if sufficient guaranteed bandwidth buffers are available for the connection. Buffers in the guaranteed bandwidth buffer pool are allocated to the requested connection if the requested connection is accepted. A data processing system associated with the guaranteed bandwidth connection may be notified of the quantity of buffers allocated to the guaranteed bandwidth connection if the guaranteed bandwidth connection is accepted.

The determination if sufficient buffers are available may include determining if allocation of buffers to the guaranteed bandwidth connection would result in the guaranteed bandwidth buffer pool exceeding a predefined percentage of the total buffers available to the communications adapter. Furthermore, buffers may be allocated in an amount proportional to the requested guaranteed bandwidth.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein with respect to flowchart illustrations of embodiments or aspects of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 1:
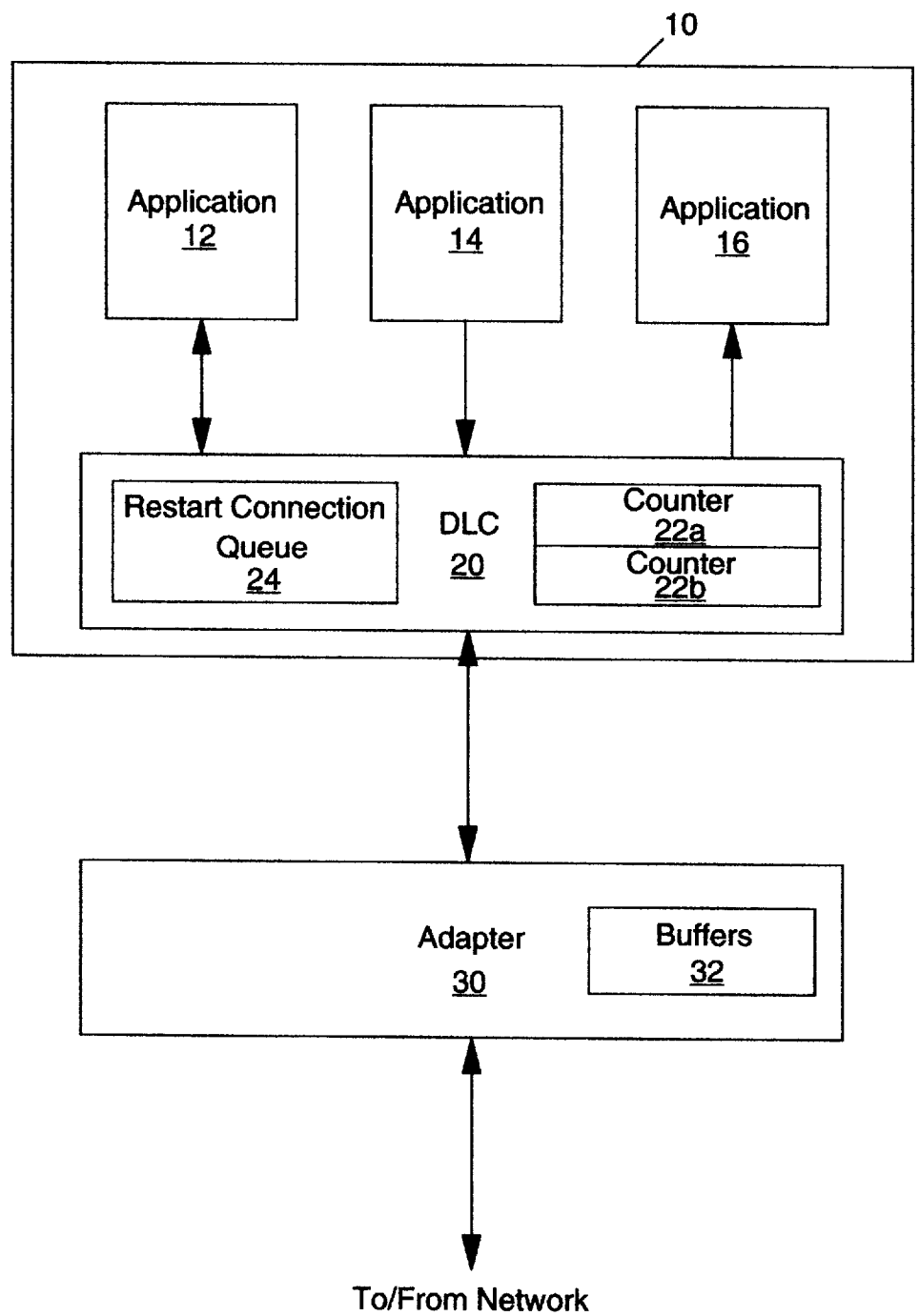
FIG. 1 is a block diagram of a data processing having a shared resource.

FIG. 1 illustrates one embodiment of the present invention in a communications environment. As seen in FIG. 1, a data processing system 10 has multiple concurrent applications 12, 14 and 16 executing on the processing system. These concurrent applications may take many forms known to those of skill in the art. Furthermore, these applications may be associated with a single user or multiple users of the data processing system 10. However, each of the applications 12, 14 and 16 may generate data to be transmitted by the communications adapter 30 or receive data which is transmitted to the communications adapter 30. This transmission and receipt of data is referred to herein as a "connection." Thus, each of the applications 12, 14 and 16 may be considered a user of the communications adapter 30. Accordingly, as used herein the term "user" refers to any software programs which establish a connection through a communications adapter, including applications, procedures, operating systems, applets, device drivers, protocol layers or other software components known to those of skill in the art.

The data processing system 10 also has a DLC layer 20 which provides access to the communications adapter 30 to the applications 12, 14 and 16. As is illustrated in FIG. 1, the communications with the applications 12, 14 and 16 may be bi-directional (application 12), transmit only (application 14) or receive only (application 16).

The communications adapter 30 includes data storage devices such as registers, random access memory or the like which provide buffers 32 in which to store data for transmission by the communications adapter, either to the DLC layer 20 or to a network. Because the buffers 32 are finite in size, if too much data is received by the adapter 32, then the adapter discards the data. Communications adapters which may be utilized in the present invention include Open System Architecture (OSA) adapters.

The connections established between the DLC layer 20 and adapter 30 may be guaranteed bandwidth or best efforts connections. Methods of establishing both guaranteed bandwidth and best efforts connections through a communications adapter are known to those of skill in the art and need not be described herein.

FIG. 1 also illustrates maximum data counters 22a and 22b. The counters 22a and 22b are associated with guaranteed bandwidth connections using the DLC layer 20 and count the amount of data in a given interval of time which is transmitted to the adapter 30 for a guaranteed bandwidth connection.

FIG. 1 further illustrates a restart connection queue 24 in the DLC layer 20 of the data processing system 10. The restart connection queue 24 is utilized by the present invention to notify users of the restart of halted connections. Connections are placed in the restart connection queue when their corresponding counter indicates that the maximum amount of data for a time interval, the maximum threshold value, has been transmitted to the adapter 30. Connections are removed from the restart connection queue 24 when users of the connections are informed that the connection has been restarted.

While the present invention is described herein with respect to two counters and two concurrent guaranteed bandwidth connections, as will be appreciated by those of skill in the art, more than two guaranteed bandwidth connections may be established for an adapter 30. Furthermore, the present invention need not be limited to data processing systems having a DLC layer 20 but may be utilized with any device communicating with a communications adapter which utilizes buffers and supports guaranteed bandwidth connections.

Figure 2:
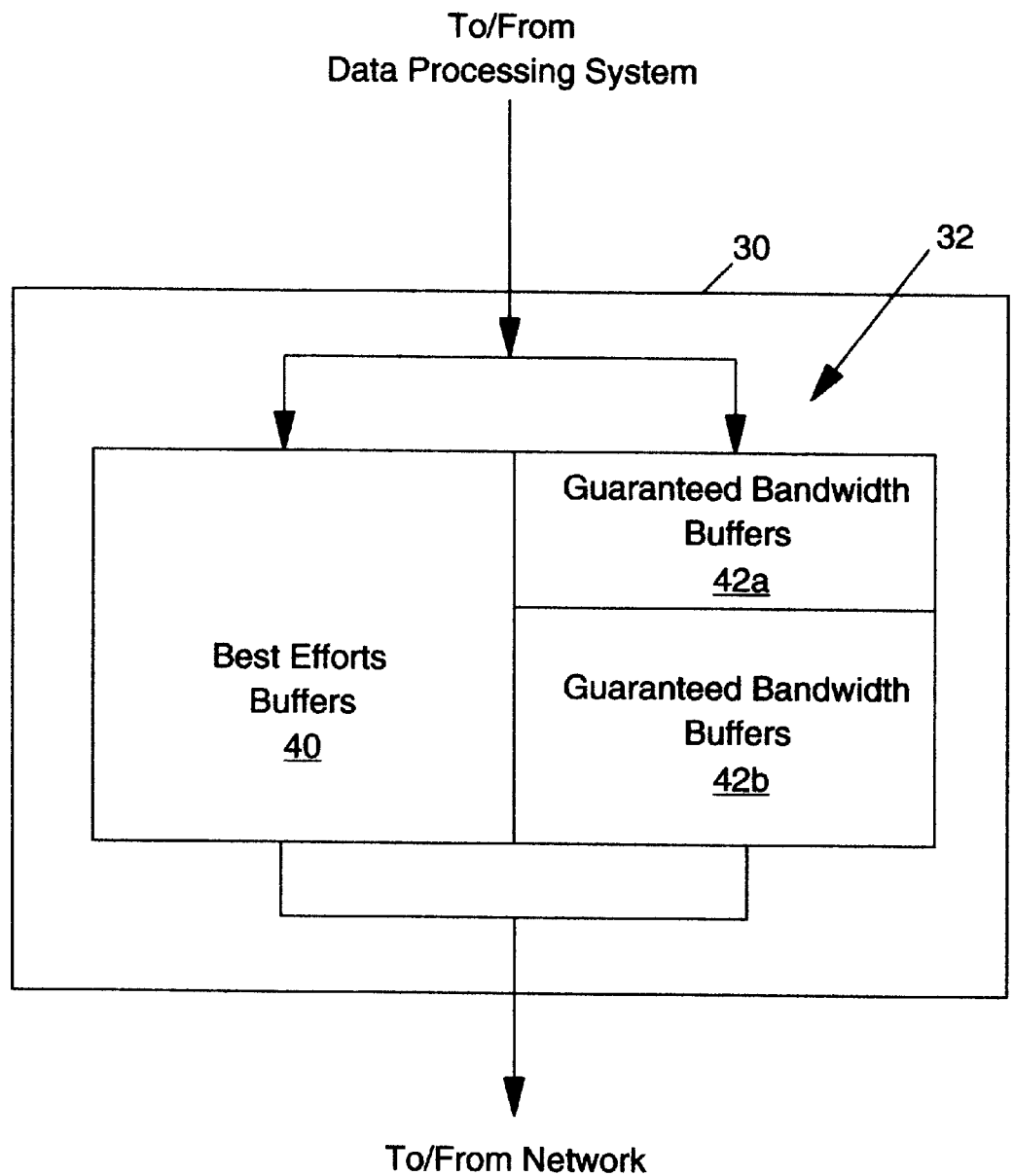
FIG. 2 is a block diagram of a communications adapter according to the present invention.

FIG. 2 illustrates a communications adapter 30 and the allocation of buffers 32 within communications adapter 30 according to the present invention. As seen in FIG. 2, the buffers are allocated into two pools. One pool is allocated to guaranteed bandwidth connections 42a and 42b, and the remaining buffers 40 are allocated to best efforts connections. The size of the guaranteed bandwidth connections buffer pool is based upon the number of guaranteed bandwidth connections associated with the adapter 30. As seen in FIG. 2, the guaranteed bandwidth pool is illustrated as divided into two groups of buffers 42a and 42b. Thus, the first group 42a is associated with a first guaranteed bandwidth connection and the second group 42b is associated with a second guaranteed bandwidth connection through adapter 30.

For example, application 12 of FIG. 1 may require a guaranteed bandwidth connection of 1.5 MB/sec. Buffers 42a would be assigned by adapter 30 to the guaranteed bandwidth connection associated with application 12. Similarly, counter 22a in the DLC layer 20 may be associated with the guaranteed bandwidth connection. Application 14 may also require a guaranteed bandwidth connection which may be 2 Mb/sec. Buffers 42b and counter 22b would be allocated to the guaranteed bandwidth connection associated with application 14. Finally, application 16 may require a best efforts connection through adapter 30. The adapter 30 would then assign the best efforts buffers 40 to the connection associated with application 16. No counter is required for best effort communications.

In operation, the guaranteed bandwidth buffers 42a and 42b may expand and contract as needed. In fact, the guaranteed bandwidth buffers may even expand into the best efforts buffers if for a given interval the guaranteed bandwidth connection is over-utilized. However, the best efforts buffers 40 will not expand into the memory allocated for guaranteed bandwidth buffers as the guaranteed bandwidth buffers are reserved for guaranteed bandwidth connections. This one way expansion of the guaranteed bandwidth buffers further assures that the guaranteed bandwidth connections will not have data discarded by the communications adapter 30.

Figure 3:
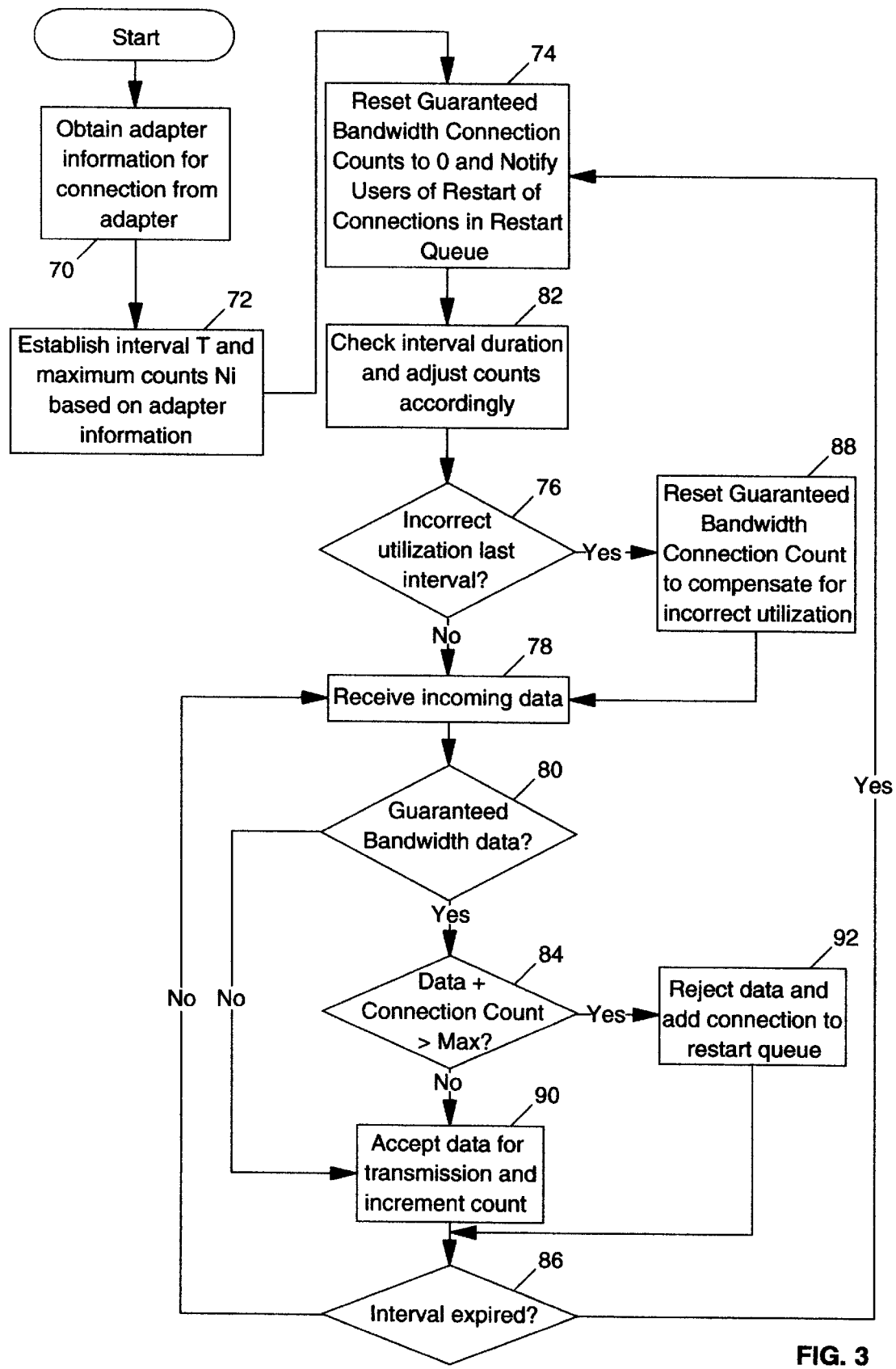
FIG. 3 is a flow chart illustration of the operation of a data processing system utilizing one embodiment of the present invention to communicate with a communications adapter.

Operation of one embodiment of the present invention will now be described with respect to FIG. 3, which illustrated the operations of the DLC layer 20 of FIG. 1. As seen in FIG. 3, the DLC layer 20 obtains adapter information (block 58 of FIG. 4) for the adapter 30 (block 70). In the OSA adapter example, when a data processing system is established as a user of OSA a signal called Activate SAP is sent to the adapter. On the reply to this request OSA provides the OSA transmit capacity and the total OSA capacity. This information may then be utilized as discussed below to establish the appropriate thresholds.

The adapter information, along with information on the time to transmit data to the adapter is then used to determine a timer value T which establishes a predefined time interval and a maximum data count for each guaranteed bandwidth connection $N_i$ where i is the $i^{th}$ guaranteed bandwidth connection (block 72). The maximum data count $N_i$ acts as a maximum threshold value. $N_i$ and T values are preferably selected based upon the amount of buffers allocated to the connection, the time to transmit data to the adapter and the service time for the data once it has reached the adapter. The interval T and the maximum data count $N_i$ are preferably selected so that the average queue length in the adapter (the amount of buffers used for the connection) does not exceed a specified percentage of the available buffers. Preferably, the same T values is utilized for each guaranteed bandwidth connection of an adapter. Furthermore, the value of T may be predefined in both the adapter 30 and the DLC layer 20. However, in such a case the flexibility to handle various adapters with differing amounts of memory may be reduced.

After establishing the $N_i$ and T values, the DLC layer 20 resets a counter, such as counters 22a or 22b, associated with the guaranteed bandwidth connection to zero (block 74). The DLC layer 20 also notifies any users of connections in a connection restart queue 24 of the availability of the adapter for that connection (block 74). Such a notification may be made by transmitting a message, setting a flag, or providing a signal to indicate whether information is to be transmitted to the DLC layer for transmission to the adapter.

The DLC layer 20 checks to see if a previous time interval has been expanded beyond T (block 82). An interval may be expanded or contracted as a result of variations in the timer utilized to measure the interval. The maximum count $N_i$ may be adjusted to compensate for the expansion or contraction of the previous interval by modifying the maximum count proportional to the difference between the actual interval and the expected interval. Thus, if the actual interval is 0.12 seconds and the expected interval was 0.1 seconds, then the maximum count may be increased by 20 percent.

After notifying users and resetting the counts for the connection for a new interval, the DLC layer 20 tests to see if the adapter 30 was incorrectly utilized by a guaranteed bandwidth connection during the previous interval (block 76). An adapter 30 may be under utilized for any number of reasons including insufficient data supplied to the guaranteed bandwidth connection or over-utilization of the adapter 30 by best efforts connections early in an interval. Thus, for example, if the interval is established as 0.1 seconds and the guaranteed bandwidth connection is 1 Mb/sec., then if less than 100 kb of data were provided to the adapter 30 for the previous interval then the adapter 30 was under-utilized by the guaranteed bandwidth connection.

If the guaranteed bandwidth connection was incorrectly utilized for the previous interval, then the DLC layer 20 may compensate for the incorrect utilization of the connection by modifying the value of $N_i$ for the next interval (block 88). This modification may be accomplished by altering the start count of the guaranteed bandwidth connection count to reflect the incorrect utilization. For example, of $N_i$ is 100 kb and only 80 kb of utilization occurred in an interval, then the guaranteed bandwidth connection count would be reset to −20 kb to reflect the under-utilization. However, if less than 20 kb is utilized in the next interval the total under-utilization is not carried forward into the next interval. If the resultant count is a negative value after the next interval, the connection count is not altered in the following interval and the bandwidth is, thereby, increased by the amount the value is negative. Thus, the bandwidth of any one connection is limited to two times the threshold bandwidth for a given time interval. By compensating for under-utilization, the present invention better accommodates the bursty nature of the data transfer.

After compensation for utilization errors or if no compensation is required, the DLC layer 20 receives the incoming data (block 78) and determines if the data is for a guaranteed bandwidth connection (block 80). If the data is not for guaranteed bandwidth, then the data is accepted for transmission (block 90) as it is best efforts data. The DLC layer 20 then checks to see if the interval T has expired (block 86) and if not receives more data (block 78).

If the connection is a guaranteed bandwidth connection, the DLC layer 20 tests to see if the received data would cause the maximum count to be exceeded (block 84). If so, the data is not transmitted to the communications adapter 30 and the connection is suspended and placed in the restart queue 24 (block 92). No further data will be transmitted to the adapter for this connection for the current interval. The user (application) may also be notified that the connection has been suspended by placing the connection in the restart queue 24. The user may be responsible for assuring that the data not sent to the communications adapter is retransmitted. Techniques for such retransmission are known to those of skill in the art. Alternatively, the DLC layer 20 may buffer the data for later transmission. If, however, the data does not cause the maximum count to be exceeded, then the data is accepted for transmission (block 90) and provided to the communications adapter 30.

As will be appreciated by those of skill in the art, the present invention provides for packets of data to be transmitted to the communications adapter 30 by the DLC layer 20. These packets of data are typically in a predefined size for a given connection. The fixed size nature of the data packets results in the possibility that the maximum data count may not fall on a packet boundary. For example, to a guaranteed bandwidth connection is a 1.5 Mb/sec. connection and the interval is 0.1 seconds, then the present invention would 150 Kb per interval to be transmitted for the connection. However, if the packet size is 4 Kb then the count will reach 148 Kb and the next packet will cause the maximum count to be exceeded. Preferably, the additional packet will not be sent to the adapter and the count will not be exceeded. However, if the additional packet is accepted and the count exceeded, on the next interval, the starting count for the connection will be adjusted to reflect the over-utilization of the connection on the previous interval and the start count could be set to 2 Kb to compensate for the additional data of the previous interval. Alternatively, the maximum threshold could be set to 148 Kb to compensate for the additional 2 Kb transmitted during the previous interval.

The DLC layer 20 then determines if the interval has expired (block 86). If the interval has expired, the count is reset and the users of the connections in the restart queue 24 are notified of the restart of the connection and that data will be received for those connections (block 74). If the interval has not expired the operations from block 78 are repeated for the next incoming data.

Figure 4:
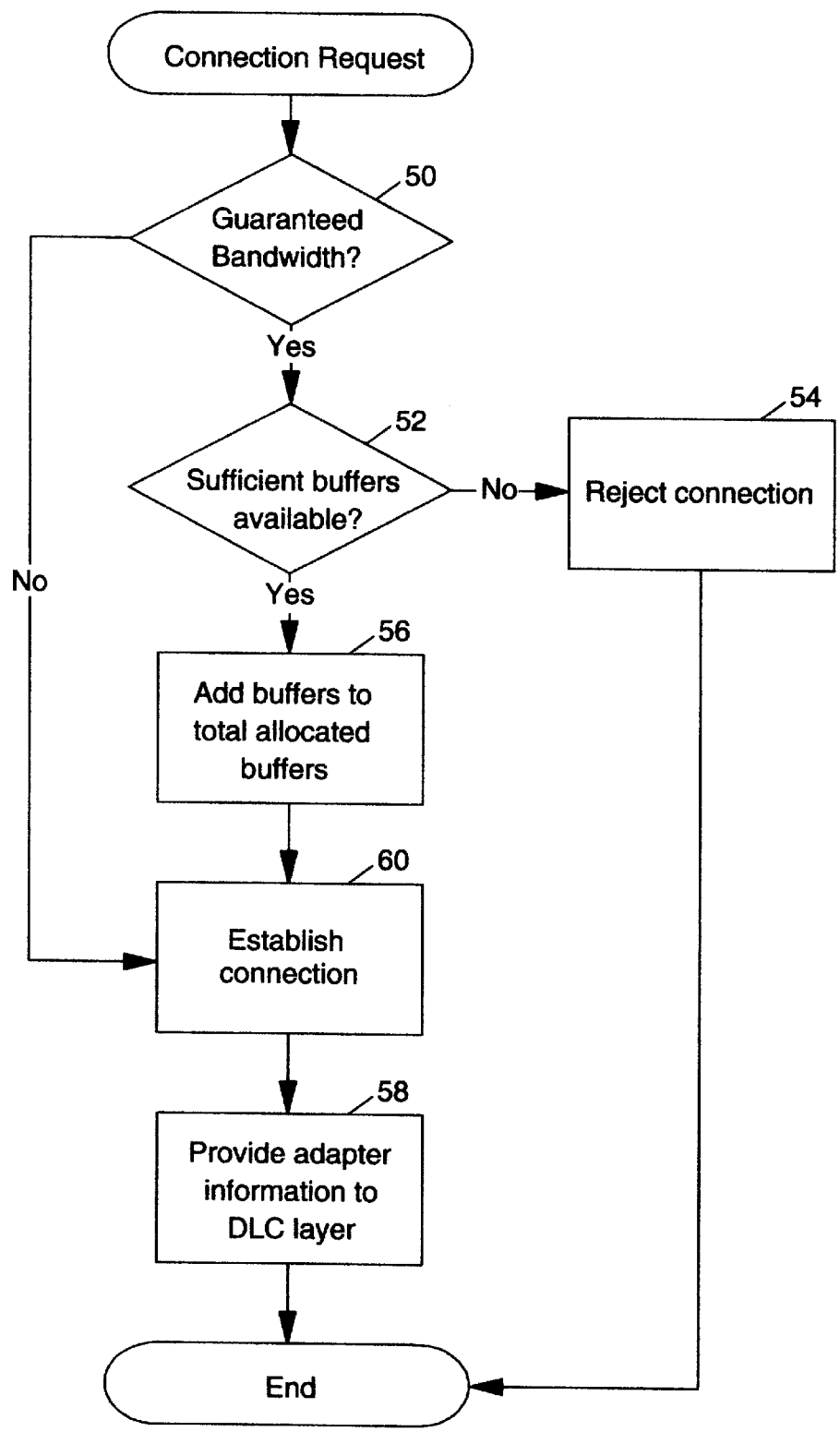
FIG. 4 is a flow chart illustration of the operation of an adapter utilizing one embodiment of the present invention.

FIG. 4 illustrates the operations of an adapter 30 according to the present invention. As seen in FIG. 4, when a request for a connection is received by adapter 30, the adapter checks to see if the request of for a guaranteed bandwidth connection (block 50). If the request is not for a guaranteed bandwidth connection, then the request is processed as a standard best efforts connection and the connection is established (block 60).

However, if the connection request is for a guaranteed bandwidth connection, the adapter 30 checks to see if sufficient buffers are available for the connection (block 52). For each guaranteed bandwidth connection the adapter 30 determines the amount of buffer space needed to hold the amount of data for a predetermined time interval (T) based on the guaranteed bandwidth of the connection. The amount of data required to be stored in the buffers may be expressed as B×T where B is the guaranteed bandwidth of the connection. The adapter 30 tracks the total amount of buffer space needed for all of its guaranteed bandwidth connections. When a request for a new guaranteed bandwidth connection is received by the adapter 30, the adapter 30 determines if sufficient unallocated reserved bandwidth buffer space is available to hold the B×T amount of data for the requested connection and if not, rejects the connection request (block 54).

The adapter 30 may allocate up to a maximum percentage of its total buffer space to guaranteed bandwidth connections. The adapter may then allocate buffers based upon the requested guaranteed bandwidth and the time interval T. For example, if a request requests a guaranteed bandwidth of 1 MB/sec., and the time interval is 0.1 seconds, then the adapter 30 may allocate one tenth of the bandwidth (B×T) or 100 kb of buffers to the requested connection.

If the adapter 30 determines that sufficient buffer space is available for the requested connection, then the adapter adds the buffers used for the connection to the total count of allocated buffers for the adapter (block 56). The adapter then establishes the connection (block 60). The adapter 30 also provides to the DLC layer 20 information about the buffer allocation of the adapter and the service time of the data after it reaches the adapter (block 58).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of controlling the data rate through a communications adapter having at least one guaranteed bandwidth connection through the communications adapter, the method comprising the steps of:

assigning to the guaranteed bandwidth connection, a maximum threshold value proportional to the amount of data to be transmitted through the communications adapter in a time interval to satisfy the guaranteed bandwidth of the connection;

counting the amount of data transmitted through the communications adapter for the guaranteed bandwidth connection so as to provide a connection data count associated with the guaranteed bandwidth;

suspending transmitting to the communications adapter, data associated with the guaranteed bandwidth connection if transmission of the data would cause the connection data count to exceed the maximum threshold value assigned to the guaranteed bandwidth connection;

resetting the connection data count after expiration of the time interval; and revising the maximum threshold value so as to compensate for actual utilization of the guaranteed bandwidth connection during a previous time interval.

2. A method according to claim 1, wherein said step of assigning comprises the steps of:

assigning to the guaranteed bandwidth connection, a maximum threshold value proportional to the amount of data to be transmitted through the communications adapter in the time interval to satisfy the guaranteed bandwidth of the connection based upon an amount of buffers allocated to the guaranteed bandwidth connection by the communications adapter, a time to transmit data to the communications adapter and a service time for data transmitted to the communications adapter once the data has reached the communications adapter.

3. A method according to claim 2, further comprising the step of obtaining an amount of buffers allocated to the guaranteed bandwidth connection by the communications adapter and the service time for data transmitted to the communications adapter once the data has reached the communications adapter from the communications adapter.

4. A method according to claim 1, wherein said step of counting comprises incrementing a counter for each byte of data transmitted to the communications adapter and wherein said step of revising comprises the step of resetting the counter a negative value equal to the amount of under-utilization of the guaranteed bandwidth connection during an immediately previous time interval.

5. A method according to claim 1, wherein said step of counting comprises decrementing a countdown counter initialized to the maximum threshold value for each byte of data transmitted to the communications adapter and wherein said step of revising comprises the step of increasing initialized value of the countdown counter by an amount equal to the under-utilization of the guaranteed bandwidth connection during an immediately previous time interval.

6. A method according to claim 1, wherein said step of suspending transmitting to the communications adapter, data associated with the guaranteed bandwidth connection further comprises the steps of:

placing an indicator of the guaranteed bandwidth connection in a restart connection queue if data transmission to the communications adapter for a connection is suspended; and notifying a user of the guaranteed bandwidth connection that the connection is suspended.

7. A method according to claim 6, wherein said resetting step further comprises the steps of:

notifying users of the connection in the restart connection queue that data may be transmitted to the communications adapter associated with the connection; and removing the connection indicator from the restart connection queue.

8. The method according to claim 1, wherein the communication adapter carries out the steps of segregating buffers resident on the communications adapter into a pool of buffers for guaranteed bandwidth connections and a pool of buffers for best efforts connections;

determining if a request for a connection through the communications adapter is a request for a guaranteed bandwidth connection;

determining if sufficient guaranteed bandwidth buffers are available for the requested guaranteed bandwidth connection;

rejecting the request for a guaranteed bandwidth connection if sufficient guaranteed bandwidth buffers are not available for the connection;

accepting the request for a guaranteed bandwidth connection if sufficient guaranteed bandwidth buffers are available for the connection; and allocating the buffers in the guaranteed bandwidth buffer pool to the requested connection if the requested connection is accepted.

9. A method according to claim 8, further comprising the step of notify a data processing system associated with the guaranteed bandwidth connection of the quantity of buffers allocated to the guaranteed bandwidth connection if the guaranteed bandwidth connection is accepted.

10. A method of controlling the data rate through a communications adapter having at least one guaranteed bandwidth connection through the communications adapter, the method comprising the steps of:

assigning to the guaranteed bandwidth connection, a maximum threshold value proportional to the amount of data to be transmitted through the communications adapter in a time interval to satisfy the guaranteed bandwidth of the connection;

counting the amount of data transmitted through the communications adapter for the guaranteed bandwidth connection so as to provide a connection data count associated with the guaranteed bandwidth;

suspending transmitting to the communications adapter, data associated with the guaranteed bandwidth connection if transmission of the data would cause the connection data count to exceed the maximum threshold value assigned to the guaranteed bandwidth connection;

resetting the connection data count after expiration of the time interval; and wherein said time interval varies between successive time intervals and wherein said assigning step further includes the step of assigning maximum threshold values to compensate for variations in the time interval.

11. A method according to claim 10, wherein said step of assigning maximum threshold values to compensate for variations in the time interval comprises the steps of:

defining a default time interval associated with the guaranteed bandwidth connection upon which the maximum threshold value is based;

determining an actual time interval between a previous occurrence of said resetting step; and compensating the maximum threshold value proportional to the difference between the default time interval and the actual time interval.

12. A method of controlling a communications adapter capable of supporting guaranteed bandwidth connections, the method comprising:

segregating buffers resident on the communications adapter into a pool of buffers for guaranteed bandwidth connections and a pool of buffers for best efforts connections;

determining if a request for a connection through the communications adapter is a request for a guaranteed bandwidth connection;

determining if sufficient guaranteed bandwidth buffers are available for the requested guaranteed bandwidth connection;

rejecting the request for a guaranteed bandwidth connection if sufficient guaranteed bandwidth buffers are not available for the connection;

accepting the request for a guaranteed bandwidth connection if sufficient guaranteed bandwidth buffers are available for the connection;

allocating the buffers in the guaranteed bandwidth buffer pool to the requested connection if the requested connection is accepted; and wherein said step of determining if sufficient guaranteed bandwidth buffers are available comprises the step of determining if allocation of buffers to the a guaranteed bandwidth connection would result in the guaranteed bandwidth buffer pool exceeding the predefined percentage of the total buffers available to the communications adapter.

13. A method according to claim 12, further comprising the step of notifying a data processing system associated with the guaranteed bandwidth connection of the quantity of buffers allocated to the guaranteed bandwidth connection if the guaranteed bandwidth connection is accepted.

14. A method according to claim 12, wherein said step of allocating the buffers comprises the step of allocating buffers in an amount proportional to the requested guaranteed bandwidth and a predefined time interval.

15. A method according to claim 12, further comprising the steps of:

preventing use of buffers from the guaranteed bandwidth buffer pool to store data from best efforts connections; and allowing use of buffers from the best efforts buffer pool to store data from guaranteed bandwidth connections.

16. A system for controlling the data rate through a communications adapter having at least one guaranteed bandwidth connection through the communications adapter, comprising:

means for assigning to the guaranteed bandwidth connection, a maximum threshold value proportional to the amount of data to be transmitted through the communications adapter in a time interval to satisfy the guaranteed bandwidth of the connection;

means for counting the amount of data transmitted through the communications adapter for the guaranteed bandwidth connection so as to provide a connection data count associated with the guaranteed bandwidth;

means for suspending transmitting to the communications adapter, data associated with the guaranteed bandwidth connection if transmission of the data would cause the connection data count to exceed the maximum threshold value assigned to the guaranteed bandwidth connection;

means for resetting the connection data count after expiration of the time interval; and means for revising the maximum threshold value so as to compensate for actual utilization of the guaranteed bandwidth connection during a previous time interval.

17. A system according to claim 16, wherein said means for assigning comprises means for assigning to the guaranteed bandwidth connection, a maximum threshold value proportional to the amount of data to be transmitted through the communications adapter in a time interval to satisfy the guaranteed bandwidth of the connection based upon an amount of buffers allocated to the guaranteed bandwidth connection by the communications adapter, a time to transmit data to the communications adapter and a service time for data transmitted to the communications adapter once the data has reached the communications adapter.

18. A system according to claim 17, further comprising means for obtaining an amount of buffers allocated to the guaranteed bandwidth connection by the communications adapter and a service time for data transmitted to the communications adapter once the data has reached the communications adapter from the communications adapter.

19. A system according to claim 16, wherein said means for suspending transmitting to the communications adapter, data associated with the guaranteed bandwidth connection further comprises:

means for placing an indicator of the guaranteed bandwidth connection in a restart connection queue if data transmission to the communications adapter for a connection is suspended; and means for notifying a user of the guaranteed bandwidth connection that the connection is suspended.

20. A system for controlling the data rate through a communications adapter having at least one guaranteed bandwidth connection through the communications adapter, comprising:

means for assigning to the guaranteed bandwidth connection, a maximum threshold value proportional to the amount of data to be transmitted through the communications adapter in a time interval to satisfy the guaranteed bandwidth of the connection;

means for counting the amount of data transmitted through the communications adapter for the guaranteed bandwidth connection so as to provide a connection data count associated with the guaranteed bandwidth;

means for suspending transmitting to the communications adapter, data associated with the guaranteed bandwidth connection if transmission of the data would cause the connection data count to exceed the maximum threshold value assigned to the guaranteed bandwidth connection;

means for resetting the connection data count after expiration of the time interval; and wherein said time interval varies between successive time intervals and wherein said means for assigning further includes means for assigning maximum threshold values to compensate for variations in the time interval.

21. A system according to claim 20, wherein said means for assigning maximum threshold values to compensate for variations in the time interval comprises:

means for defining a default time interval associated with the guaranteed bandwidth connection upon which the maximum threshold value is based;

means for determining an actual time interval between a previous occurrence of operation of said means for resetting; and means for compensating the maximum threshold value proportional to the difference between the default time interval and the actual time interval.

22. A system for controlling a communications adapter capable of supporting guaranteed bandwidth connections, comprising:

means for segregating buffers resident on the communications adapter into a pool of buffers for guaranteed bandwidth connections and a pool of buffers for best efforts connections;

means for determining if a request for a connection through the communications adapter is a guaranteed bandwidth connection request;

means for determining if sufficient guaranteed bandwidth buffers are available for the requested guaranteed bandwidth connection;

means for rejecting the request for a guaranteed bandwidth connection if sufficient guaranteed bandwidth buffers are not available for the connection;

means for accepting the request for a guaranteed bandwidth connection if sufficient guaranteed bandwidth buffers are available for the connection;

means for allocating the buffers in the guaranteed bandwidth buffer pool to the requested connection if the requested connection is accepted; and wherein said means for determining comprises means for evaluating if allocation of buffers to the a guaranteed bandwidth connection would result in the guaranteed bandwidth buffer pool exceeding a predefined percentage of the total buffers available to the communications adapter.

23. A system according to claim 22, further comprising means for notifying a data processing system associated with the guaranteed bandwidth connection of the quantity of buffers allocated to the guaranteed bandwidth connection if the guaranteed bandwidth connection is accepted.

24. A system according to claim 22, wherein said means for allocating the buffers allocates buffers in an amount proportional to the requested guaranteed bandwidth and a predefined time interval.

25. A system according to claim 22, further comprising:

means for preventing use of buffers from the guaranteed bandwidth buffer pool to store data from best efforts connections; and means for allowing use of buffers from the best efforts buffer pool to store data from a guaranteed bandwidth connection.

26. A computer program product for controlling the data rate through a communications adapter having at least one guaranteed bandwidth connection through the communications adapter, comprising:

a computer-readable storage medium having computer-readable program code means embodied in said medium, said computer-readable program code means comprising:

computer-readable program code means for assigning to the guaranteed bandwidth connection, a maximum threshold value proportional to the amount of data to be transmitted through the communications adapter in a time interval to satisfy the guaranteed bandwidth of the connection;

computer-readable program code means for counting the amount of data transmitted through the communications adapter for the guaranteed bandwidth connection so as to provide a connection data count associated with the guaranteed bandwidth;

computer-readable program code means for suspending transmitting to the communications adapter, data associated with the guaranteed bandwidth connection if transmission of the data would cause the connection data count to exceed the maximum threshold value assigned to the guaranteed bandwidth connection;

computer-readable program code means for resetting the connection data count after expiration of the time interval; and computer-readable program code means for revising the maximum threshold value so as to compensate for actual utilization of the guaranteed bandwidth connection during a previous time interval.

27. A computer program product according to claim 26, wherein said computer-readable program code means for assigning comprises computer-readable program code means for assigning to the guaranteed bandwidth connection, a maximum threshold value proportional to the amount of data to be transmitted through the communications adapter in a time interval to satisfy the guaranteed bandwidth of the connection based upon an amount of buffers allocated to the guaranteed bandwidth connection by the communications adapter, a time to transmit data to the communications adapter and a service time for data transmitted to the communications adapter once the data has reached the communications adapter.

28. A computer program product according to claim 27, further comprising computer-readable program code means for obtaining an amount of buffers allocated to the guaranteed bandwidth connection by the communications adapter and a service time for data transmitted to the communications adapter once the data has reached the communications adapter from the communications adapter.

29. A computer program product according to claim 26, wherein said computer-readable program code means for suspending transmitting to the communications adapter, data associated with the guaranteed bandwidth connection further comprises:

computer-readable program code means for placing an indicator of the guaranteed bandwidth connection in a restart connection queue if data transmission to the communications adapter for a connection is suspended; and computer-readable program code means for notifying a user of the guaranteed bandwidth connection that the connection is suspended.

30. A computer program product for controlling the data rate through a communications adapter having at least one guaranteed bandwidth connection through the communications adapter, comprising:

a computer-readable storage medium having computer-readable program code means embodied in said medium, said computer-readable program code means comprising:

computer-readable program code means for assigning to the guaranteed bandwidth connection, a maximum threshold value proportional to the amount of data to be transmitted through the communications adapter in a time interval to satisfy the guaranteed bandwidth of the connection;

computer-readable program code means for counting the amount of data transmitted through the communications adapter for the guaranteed bandwidth connection so as to provide a connection data count associated with the guaranteed bandwidth;

computer-readable program code means for suspending transmitting to the communications adapter, data associated with the guaranteed bandwidth connection if transmission of the data would cause the connection data count to exceed the maximum threshold value assigned to the guaranteed bandwidth connection;

computer-readable program code means for resetting the connection data count after expiration of the time interval; and wherein said time interval varies between successive time intervals and wherein said computer-readable program code means for assigning further includes computer-readable program code means for assigning maximum threshold values to compensate for variations in the time interval.

31. A computer program product according to claim 30, wherein said computer-readable program code means for assigning maximum threshold values to compensate for variations in the time interval comprises:

computer-readable program code means for defining a default time interval associated with the guaranteed bandwidth connection upon which the maximum threshold value is based;

computer-readable program code means for determining an actual time interval between a previous occurrence of operation of said computer-readable program code means for resetting; and computer-readable program code means for compensating the maximum threshold value proportional to the difference between the default time interval and the actual time interval.

32. A computer program product for controlling a communications adapter capable of supporting guaranteed bandwidth connections, comprising:

a computer-readable storage medium having computer-readable program code means embodied in said medium, said computer-readable program code means comprising:

computer-readable program code means for segregating buffers resident on the communications adapter into a pool of buffers for guaranteed bandwidth connections and a pool of buffers for best efforts connections;

computer-readable program code means for determining if a request for a connection through the communications adapter is a request for a guaranteed bandwidth connection;

computer-readable program code means for determining if sufficient guaranteed bandwidth buffers are available for the requested guaranteed bandwidth connection;

computer-readable program code means for rejecting the request for a guaranteed bandwidth connection if sufficient guaranteed bandwidth buffers are not available for the connection;

computer-readable program code means for accepting the request for a guaranteed bandwidth connection if sufficient guaranteed bandwidth buffers are available for the connection;

computer-readable program code means for allocating the buffers in the guaranteed bandwidth buffer pool to the requested connection if the requested connection is accepted; and wherein said computer-readable program code means for determining comprises computer-readable program code means for determining if allocation of buffers to the guaranteed bandwidth connection would result in the guaranteed bandwidth buffer pool exceeding a predefined percentage of the total buffers available to the communications adapter.

33. A computer program product according to claim 32, further comprising computer-readable program code means for notifying a data processing computer program product associated with the guaranteed bandwidth connection of the quantity of buffers allocated to the guaranteed bandwidth connection if the guaranteed bandwidth connection is accepted.

34. A computer program product according to claim 32, wherein said computer-readable program code means for allocating the buffers comprises the computer-readable program code means for allocating buffers in an amount proportional to the requested guaranteed bandwidth and a predefined time interval.

35. A computer program product according to claim 32, further comprising:

computer-readable program code means for preventing use of buffers from the guaranteed bandwidth buffer pool to store data from best efforts connections; and computer-readable program code means for allowing use of buffers from the best efforts buffer pool to store data from a guaranteed bandwidth connection.

* * * * *